(12) United States Patent
Sakashita et al.

(10) Patent No.: US 8,734,553 B2
(45) Date of Patent: May 27, 2014

(54) INDOOR UNIT OF AIR CONDITIONER

(75) Inventors: Akihiko Sakashita, Osaka (JP);
Tsuyoshi Yokomizo, Osaka (JP);
Morimichi Okada, Fukuoka (JP);
Yoshiharu Michitsuji, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 12/747,388

(22) PCT Filed: Dec. 8, 2008

(86) PCT No.: PCT/JP2008/003645
§ 371 (c)(1),
(2), (4) Date: Jun. 10, 2010

(87) PCT Pub. No.: WO2009/075089
PCT Pub. Date: Jun. 18, 2009

(65) Prior Publication Data
US 2010/0263827 A1    Oct. 21, 2010

(30) Foreign Application Priority Data

Dec. 11, 2007  (JP) .................................. 2007-319981
Jan. 25, 2008  (JP) .................................. 2008-015640

(51) Int. Cl.
*B01D 46/00*    (2006.01)

(52) U.S. Cl.
USPC ................ 55/289; 55/296; 55/385.2; 55/429; 55/467.1; 55/471

(58) Field of Classification Search
CPC .. B01D 24/46–24/4689; B01D 25/32–25/386; B01D 29/0075–29/0088; B01D 29/64–29/6492; B01D 33/44–33/56; B01D 46/0057–46/0083
USPC .................. 55/282–305, 385.1–385.7, 410.1, 55/418.1, 428–433, 467.1; 165/95, 303, 165/DIG. 11, DIG. 85, 4–10, 59, 104.34, 165/DIG. 10; 65/303; 62/303, 4–10, 59, 95, 62/104.34, DIG. 10, DIG. 11, DIG. 85
See application file for complete search history.

(56) References Cited

U.S. PATENT DOCUMENTS 3,221,479 A * 12/1965 Moser et al. ..................... 55/296
7,862,636 B2 * 1/2011 Mun et al. ....................... 55/289

(Continued)

FOREIGN PATENT DOCUMENTS

CN       1892120 A      1/2007
EP       1 741 992 A2   1/2007

(Continued)

*Primary Examiner* — Duane Smith
*Assistant Examiner* — Thomas McKenzie
(74) *Attorney, Agent, or Firm* — Birch, Stewart, Kolasch & Birch, LLP.

(57) ABSTRACT

A casing (10) of an indoor unit (1) contains an indoor fan (21), an air filter (30), and an indoor heat exchanger (22). The indoor unit (1) includes: a divider plate (25) which includes an air hole (26) for attaching the air filter (30) therein, and divides space inside the casing (10) into a room upstream of an air flow passing through the air filter (30), and a room downstream of the air flow passing through the air filter (30); a dust removing mechanism (50) for removing dust trapped on the air filter (30); and a dust container (90) for containing the dust which is removed by the dust removing mechanism (50), and is transferred through a transfer duct (88). The indoor heat exchanger (22) is arranged around the indoor fan (21), and the dust container (90) is arranged below the indoor heat exchanger (22).

6 Claims, 10 Drawing Sheets

(56) References Cited

U.S. PATENT DOCUMENTS

| | | | |
|---|---|---|---|
| 2004/0000160 A1* | 1/2004 | Takashima et al. | 62/317 |
| 2006/0070358 A1* | 4/2006 | Oda et al. | 55/295 |
| 2007/0060036 A1* | 3/2007 | Shibuya et al. | 454/187 |
| 2007/0084235 A1* | 4/2007 | Okazawa et al. | 62/419 |
| 2008/0223062 A1* | 9/2008 | Yabu et al. | 62/259.1 |
| 2010/0107575 A1* | 5/2010 | Zhang et al. | 55/289 |
| 2010/0116463 A1* | 5/2010 | Zhang et al. | 165/95 |
| 2010/0323606 A1* | 12/2010 | Okada et al. | 454/338 |

FOREIGN PATENT DOCUMENTS

| | | | |
|---|---|---|---|
| JP | 62-145017 U | | 9/1987 |
| JP | 64-23036 A | | 1/1989 |
| JP | 7-243662 A | | 9/1995 |
| JP | 2004-85003 A | | 3/2004 |
| JP | 2004-92997 A | | 3/2004 |
| JP | 2004-340507 A | | 12/2004 |
| JP | 2005-83612 A | | 3/2005 |
| JP | 2005-83721 A | | 3/2005 |
| JP | 2005-308274 A | | 4/2005 |
| JP | 2007038215 A | * | 2/2007 |
| JP | 2007130628 A | * | 5/2007 |
| JP | 2007-232242 A | | 9/2007 |
| JP | 2007-309581 A | | 11/2007 |
| JP | 2007-309583 A | | 11/2007 |
| JP | 2007292399 A | * | 11/2007 |
| WO | WO 2007060920 A1 | * | 5/2007 |

\* cited by examiner (A)

(B)

(C)

INDOOR UNIT OF AIR CONDITIONER

TECHNICAL FIELD

The present invention relates to indoor units of air conditioners, particularly to measures to improve air conditioning capability.

BACKGROUND ART

Indoor units of air conditioners having an air filter at an air inlet have been known. In an indoor unit of this type, an air blowing fan and a drive motor are arranged substantially in the center of a casing, a heat exchanger is arranged outside the air blowing fan, a front panel having a suction grille is arranged on the front side of the casing, and an air guider is arranged between the front panel and the air blowing fan.

Room air is sucked through the suction grille by the air blowing fan, and is supplied to the heat exchanger through the air guider. Then, the air that exchanged heat in the heat exchanger is blown out through outlets formed in the front panel outside the suction grille.

An air filter for preventing dust contained in the sucked air from entering the casing is detachably attached to the front panel inside the suction grille. Therefore, a user has to regularly remove the dust adhered to the air filter.

For example, Patent Document 1 describes an indoor unit of an air conditioner having an air filter at an air inlet. The indoor unit includes a dust removing section for sucking the dust trapped on the air filter with a suction nozzle while rotating the air filter, and a dust collecting device for containing the dust removed by the dust removing section. With this configuration, the dust trapped on the air filter can be removed, and the removed dust can be collected in the dust collecting device without requiring user intervention.

Patent Document 1: Japanese Patent Publication No. 2005-83612

SUMMARY OF THE INVENTION

Technical Problem

In the indoor unit of the air conditioner of Patent Document 1, the dust collecting device is arranged in the casing between the air blowing fan and the heat exchanger. Therefore, the room air blown from the air blowing fan strikes the dust collecting device, and the amount of the room air supplied to the heat exchanger is reduced. This results in decrease in air conditioning capability.

In view of the foregoing, the present invention has been achieved. An object of the invention is to improve the air conditioning capability by increasing the amount of the room air supplied to the heat exchanger.

Solution to the Problem

A first aspect of the invention is directed to an indoor unit of an air conditioner including: a casing (10) having an inlet (13); an indoor fan (21), an air filter (30), and a heat exchanger (22) contained in the casing (10); a dust removing section (50) for removing dust trapped on the air filter (30); and a dust container (90) for containing the dust which is removed by the dust removing section (50), and is transferred through a transfer passage (88), wherein the dust container (90) is arranged in the casing (10) outside an air flow running from the inlet (13) to the heat exchanger (22).

According to the first aspect of the invention, in normal operation, the room air is admitted into the casing (10) by rotating the indoor fan (21). When the admitted air passes through the air filter (30), the dust contained in the room air is trapped on the air filter (30). The room air that passed through the air filter (30) is supplied to the heat exchanger (22) for heat exchange The room air that exchanged heat is blown outside the casing (10). For cleaning the air filter (30), the dust removing section (50) removes the dust trapped on the air filter (30). The removed dust is transferred through the transfer passage (88), and is contained in the dust container (90). Since the dust container (90) is arranged outside the air flow, the dust container does not interfere with the air flow.

A second aspect of the invention is directed to an indoor unit of an air conditioner including: a casing (10) having an inlet (13); an indoor fan (21), an air filter (30), and a heat exchanger (22) contained in the casing (10); a dust removing section (50) for removing dust trapped on the air filter (30); and a dust container (90) for containing the dust which is removed by the dust removing section (50), and is transferred through a transfer passage (88), wherein the dust container (90) is arranged in the casing (10) outside an air hole (26) in which the air filter (30) is attached.

According to the second aspect of the invention, the dust is removed in the same manner as in the first aspect of the invention. In addition, since the dust container (90) is arranged outside the air hole (26), the dust container does not interfere with the air flow.

In a third aspect of the invention related to the first or second aspect of the invention, a divider member (25) which includes an air hole (26) for attaching the air filter (30) therein, and divides space inside the casing (10) into a room upstream of air passing through the air filter (30), and a room downstream of the air passing through the air filter (30). The dust container (90) is arranged on the divider member (25) to be located around the air hole (26).

According to the third aspect of the invention, the room air is admitted into the casing (10) by the indoor fan (21). The room air that passes through the air hole (26) passes through the air hole (26) to enter the heat exchanger (22) without striking the dust container (90).

In a fourth aspect of the invention related to the first or second aspect of the invention, the heat exchanger (22) is arranged around the indoor fan (21), and the dust container (90) is arranged below the heat exchanger (22).

According to the fourth aspect of the invention, the room air admitted into the casing (10) by the indoor fan (21) is blown out in a radial direction of the rotation of the indoor fan (21). The blown room air flows into the heat exchanger (22) arranged around the indoor fan (21) without striking the dust container (90).

In a fifth aspect of the invention related to the third aspect of the invention, the dust container (90) includes a concave portion (95) extending along an edge of the air hole (26) when viewed in plan.

According to the fifth aspect of the invention, the room air is admitted into the casing (10) by the indoor fan (21). The room air that passes through the air hole (26) flows into the heat exchanger (22) through the air hole (26) without striking the dust container (90).

In a sixth aspect of the invention related to the third aspect of the invention, the dust container (90) is arranged upstream of the air flow passing through the air filter (30).

According to the sixth aspect of the invention, the room air is admitted into the casing (10) by the indoor fan (21). The room air that passed through the inlet (13) flows into the air hole (26) without striking the dust container (90).

In a seventh aspect of the invention related to the first or second aspect of the invention, the dust container (90) is in the shape of a rectangular box, and a corner inside the dust container (90) forms a guide plane (96) for guiding the air introduced into the dust container (90).

According to the seventh aspect of the invention, the dust removed by the dust removing section (50) is blown into the dust container (90) together with the air. The guide plane (96) guides the air that entered the dust container (90) to every part of the dust container (90). Thus, the dust is contained in the dust container (90) in a dispersed state.

In an eighth aspect of the invention related to the first or second aspect of the invention, the dust container (90) is located around a shroud (21c) of the indoor fan (21).

According to the eighth aspect of the invention, the room air is admitted into the casing (10) by the indoor fan (21). The room air that flows through the indoor fan (21) enters the heat exchanger (22) without striking the dust container (90).

In a ninth aspect of the invention related to the first or second aspect of the invention, the dust container (90) is located around the bell mouth (24) of the indoor fan (21).

According to the ninth aspect of the invention, the room air is admitted into the casing (10) by the indoor fan (21). The room air that flows through the indoor fan (21) enters the heat exchanger (22) without striking the dust container (90).

In a tenth aspect of the invention related to the first or second aspect of the invention, the dust removing section (50) extends from an edge of the air filter (30) to the center of the air filter (30) to be in contact with a side of the air filter (30) upstream of the air flow passing through the air filter (30), and to rotate about one end of the dust removing section (50), and the dust container (90) is arranged outside a range of rotation of the dust removing section (50) when viewed in plan.

According to the tenth aspect of the invention, the dust removing section (50) abutting the air filter (30) is rotated without striking the dust container (90). The air filter (30) is detached with the dust removing section (50) kept rotated.

In an eleventh aspect of the invention related to the first or second aspect of the invention, the dust container (90) includes a discharge port (91) which allows the inside and the outside of the dust container (90) to communicate with each other, and the casing (10) includes a discharge passage (19) which communicates with the outside of the casing (10), and is connected to the discharge port (91).

According to the eleventh aspect of the invention, the air that entered the dust container (90) is discharged outside the casing (10) from the discharge passage (19) through the discharge port (91). On the other hand, the air outside the casing (10) is admitted into the dust container (90) from the discharge passage (19) through discharge port (91).

Advantages of the Invention

According to the first aspect of the invention, the dust container (90) is arranged outside the air flow admitted into the casing (10) by the indoor fan (21). This can reliably prevent the air passing inside the casing (10) from striking the dust container (90). Thus, the room air admitted into the casing (10) can be introduced to the heat exchanger (22) without leakage. This can improve the air conditioning capability.

According to the second aspect of the invention, the dust container (90) is arranged outside the air hole (26). This can reliably prevent the air passing inside the casing (10) from striking the dust container (90). Thus, the room air admitted into the casing (10) can be introduced to the heat exchanger (22) without leakage. This can improve the air conditioning capability.

According to the third aspect of the invention, the dust container (90) is located around the air hole (26) formed in the divider member (25). This can reliably prevent the room air passing through the air hole (26) from striking the dust container (90). This can increase the amount of air supplied to the heat exchanger (22), thereby improving the air conditioning capability.

According to the fourth aspect of the invention, the dust container (90) is arranged below the heat exchanger (22). This can reliably prevent the air blown from the indoor fan (21) from striking the dust container (90). This can increase the amount of air supplied to the heat exchanger (22), thereby improving the air conditioning capability.

According to the fifth aspect of the invention, the dust container (90) includes the concave portion (95) extending along the edge of the air hole (26). This can reliably prevent the air passing through the air hole (26) from striking the dust container (90). This can increase the amount of air supplied to the heat exchanger (22), thereby improving the air conditioning capability.

According to the sixth aspect of the invention, the dust container (90) is arranged upstream of the air flow passing through the air filter (30) on the divider member (25). This makes it possible to check the dust container (90) without detaching the divider member (25), thereby allowing easy maintenance of the indoor unit (1).

According to the seventh aspect of the invention, the corner inside the dust container (90) forms a guide plane (96) for guiding the air, thereby distributing the air and dust introduced into the dust container (90) to every part of the dust container (90). This makes it possible to contain the dust in the dust container (90) without accumulating the dust in an uneven manner.

According to the eighth aspect of the invention, the dust container (90) is located around the shroud (21c) of the indoor fan (21). This can reliably prevent the room air from striking the dust container (90). This can increase the amount of air supplied to the heat exchanger (22), thereby improving the air conditioning capability.

According to the ninth aspect of the invention, the dust container (90) is located around the bell mouth (24) of the indoor fan (21). This can reliably prevent the room air from striking the dust container (90). This can increase the amount of air supplied to the heat exchanger (22), thereby improving the air conditioning capability.

According to the tenth aspect of the invention, the dust container (90) is arranged outside the range of rotation of the dust removing section (50). This makes it possible to rotate the dust removing section (90) with the dust container (90) being arranged. This allows detachment of the air filter (30) with the dust container (90) being arranged. This allows easy maintenance of the indoor unit (1).

According to the eleventh aspect of the invention, the dust container (90) includes the discharge port (91), and the casing (10) includes the discharge passage (19) connected to the discharge port (91). Therefore, the air in the dust container (90) can be discharged outside the casing (10) from the discharge passage (19) through the discharge port (91) by introducing the air to the dust container (90). Further, the air outside the casing (10) can be introduced to the dust container (90) from the discharge passage (19) through the discharge port (109) by discharging the air inside the dust container (90). This can keep the balance of air pressure in the dust container (90) to a suitable degree.

BRIEF DESCRIPTION OF THE DRAWINGS

FIG. 1 is a vertical cross-sectional view illustrating an indoor unit of an embodiment of the invention.

FIG. 2 is a horizontal cross-sectional view illustrating the indoor unit of the embodiment.

FIG. 3(A) is a schematic perspective view illustrating an upper casing of the embodiment, FIG. 3(B) is a schematic perspective view illustrating a lower casing of the embodiment, and FIG. 3(C) is a schematic perspective view illustrating a decorative panel of the embodiment.

FIG. 4 is a schematic perspective view illustrating the lower casing of the embodiment.

FIG. 5 is a schematic perspective view illustrating the lower casing of the embodiment with a dust container detached.

FIG. 6 is a schematic perspective view illustrating the lower casing of the embodiment with an access lid of the embodiment detached.

FIG. 7 is a schematic perspective view illustrating an air filter, a dust removing mechanism, a dust collecting case, and a dust transfer mechanism of the embodiment.

FIG. 8 is a cross-sectional view illustrating how the air filter and the dust collecting case are attached.

FIG. 9 is a schematic perspective view illustrating a filter drive mechanism of the embodiment.

FIG. 10 is a cross-sectional view illustrating part of the dust transfer mechanism of the embodiment.

FIG. 11 is a perspective view illustrating a dust container of a second embodiment.

FIG. 12 is a vertical cross-sectional view illustrating an indoor unit of a third embodiment.

DESCRIPTION OF EMBODIMENTS

Embodiments of the present invention will be described below with reference to the drawings.

<First Embodiment>

Figure 1:
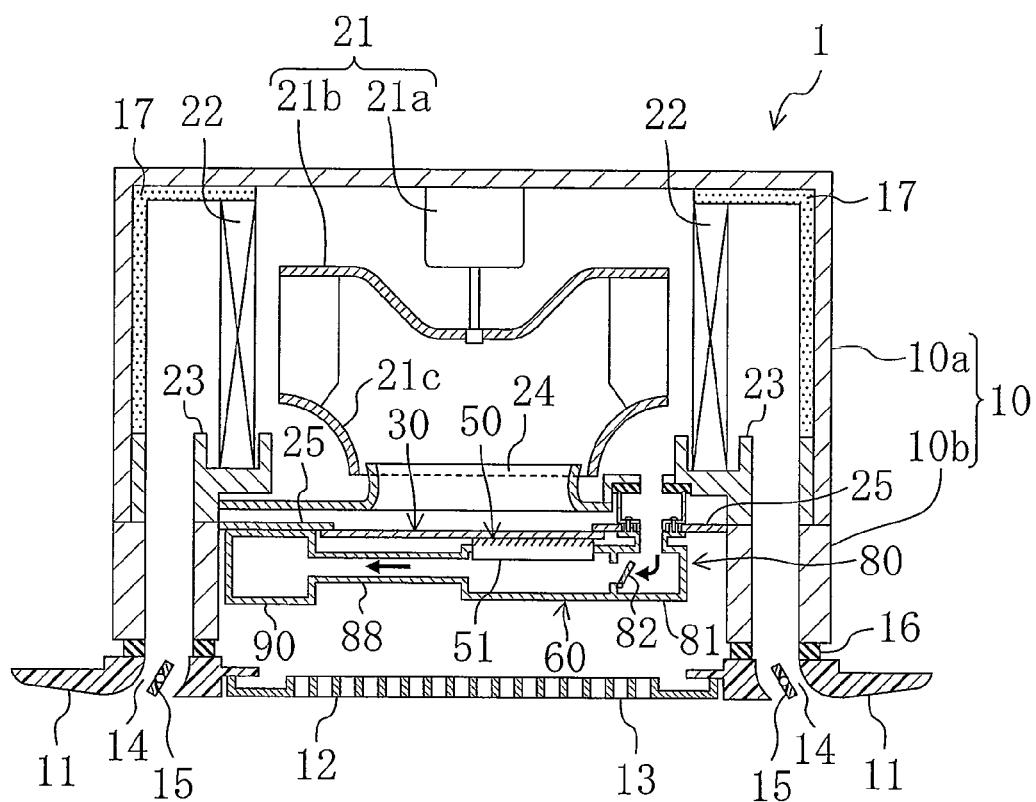
[FIG. 1]
Figure 2:
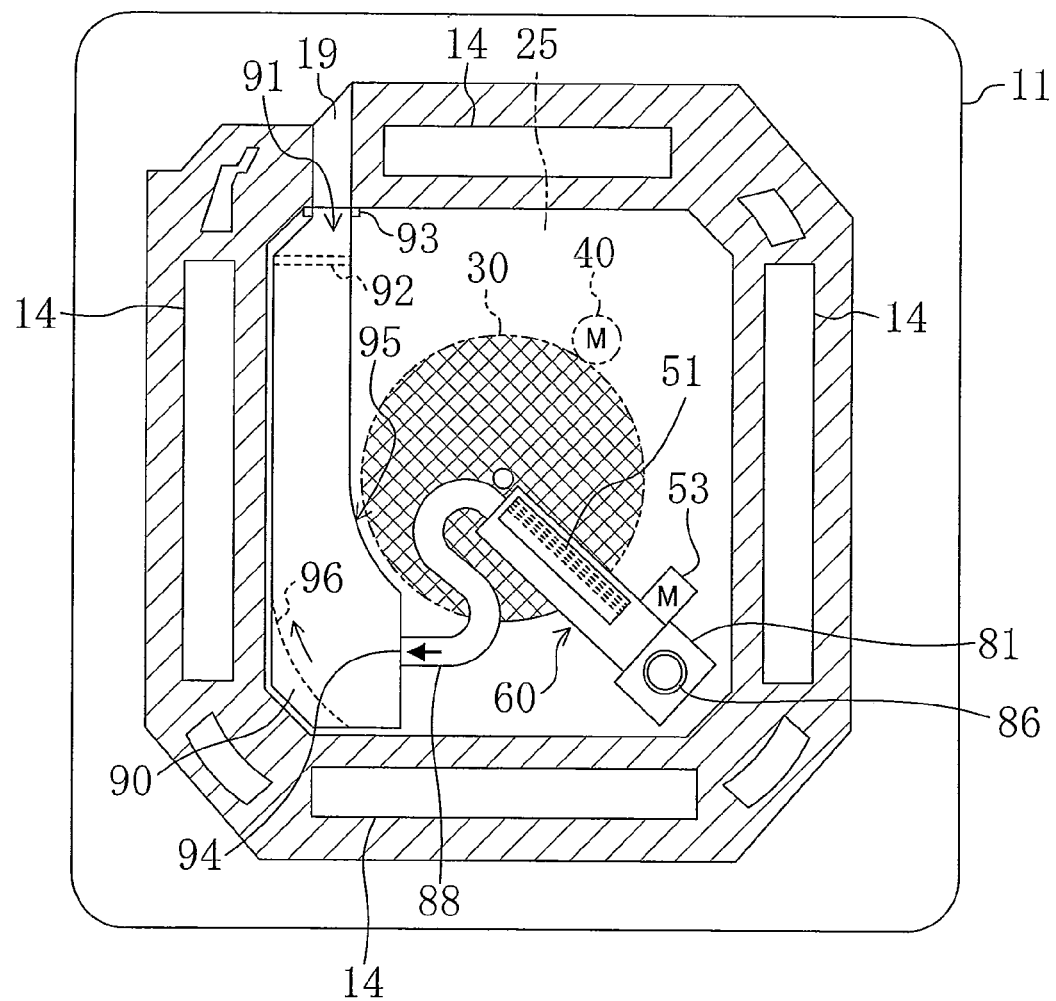
[FIG. 2]

As shown in FIGS. 1 and 2, an indoor unit (1) of the present embodiment constitutes part of an air conditioner, and is placed on a ceiling of a room. The air conditioner includes a refrigerant circuit connecting a compressor, an outdoor heat exchanger, and an expansion valve provided in an outdoor unit, and an indoor heat exchanger (22) provided in the indoor unit (1) using pipes. The refrigerant circuit performs a vapor compression refrigeration cycle by reversibly circulating a refrigerant. The air conditioner performs cooling operation where the indoor heat exchanger (22) in the refrigerant circuit functions as an evaporator, and heating operation where the indoor heat exchanger (22) in the refrigerant circuit functions as a condenser.

Figure 3:
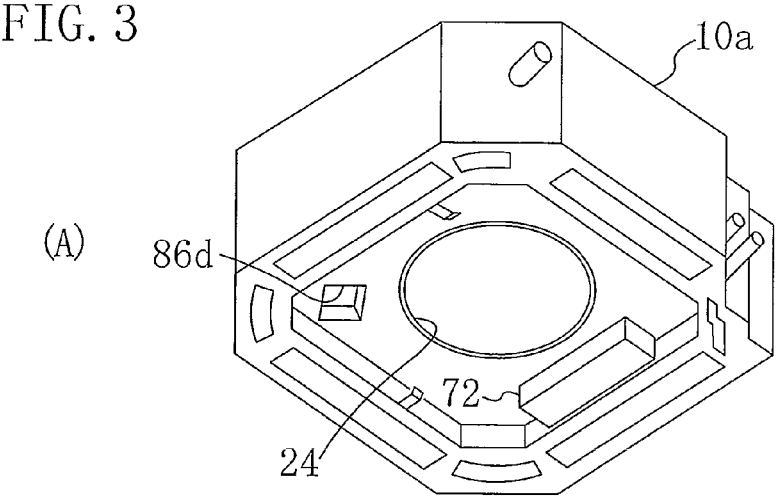
[FIG. 3]
Figure 3:
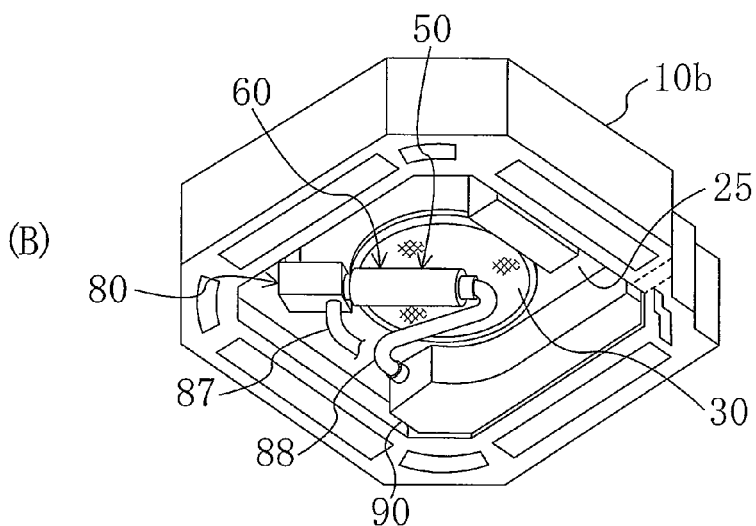
Figure 3:
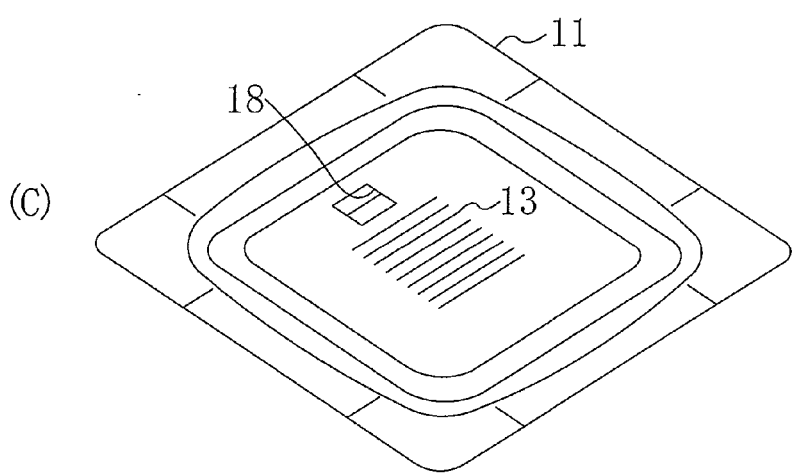

As shown in FIGS. 3(A) to 3(C), the indoor unit (1) includes a casing (10), and a decorative panel (11). The casing (10) is in the shape of a substantially rectangular parallelepiped box with an open bottom, and the decorative panel (11) is attached to a lower portion of the casing (10).

The decorative panel (11) is in the shape of a rectangular plate as shown in FIGS. 1, 2 and 3(C). When viewed in plan, the decorative panel (11) is slightly larger than the casing (10). The decorative panel (11) is attached to the casing (10) to cover the lower portion of the casing (10) with a sealing member (16) sandwiched therebetween. The decorative panel (11), when attached to a lower casing (10b), is exposed in the room.

The decorative panel (11) is provided with one inlet (13), four outlets (14), and a cleaner insertion hole (18). The inlet (13) is rectangular-shaped, and is formed in the center of the decorative panel (11). A suction grille (12) provided with slits is fitted in the inlet (13). Each of the outlets (14) is in the shape of a narrow rectangle. The outlets (14) are formed along the sides of the decorative panel (11), respectively. An adjuster plate (15) for adjusting the direction of air flow is provided at each of the outlets (14). The adjuster plate (15) rotates to adjust the direction of air flow (the direction of blowing air). The cleaner insertion hole (18) is rectangular-shaped, and is provided on the side of the inlet (13).

The casing (10) includes an upper casing (10a) and a lower casing (10b) as shown in FIGS. 3(A) and 3(B). The lower casing (10b) is integrally attached to a lower portion of the upper casing (10a).

The upper casing (10a) is in the shape of a substantially rectangular parallelepiped box. A heat insulator (17) is laminated on an inner surface of the upper casing (10a). A bell mouth (24) is formed on a lower end surface of the upper casing (10a) to communicate with an air hole (26) described later formed in the lower casing (10b).

The bell mouth (24) is a flat member, and has an opening in the center thereof, with an edge of the opening is bent upward to form a cylindrical portion.

The upper casing (10a) contains the indoor heat exchanger (22), a drain pan (23), and an indoor fan (21) as shown in FIG. 1.

The indoor fan (21) is a so-called turbo fan. The indoor fan (21) is arranged near the center of the upper casing (10a), and is located immediately above the bell mouth (24). The indoor fan (21) includes a fan motor (21a) and an impeller (21b). The fan motor (21a) is fixed to a top plate of the upper casing (10a). The impeller (21b) is coupled to a rotation shaft of the fan motor (21a). The impeller (21b) includes blades attached to a hub attached to the fan motor (21a), and a shroud (21c) which is arc-shaped when viewed in section, and is attached to lower ends of the blades. An upper end of the cylindrical portion of the bell mouth (24) faces a lower portion of the shroud (21c).

The bell mouth (124) divides space in the casing (10) upstream of the indoor heat exchanger (22) into a room near the indoor fan (21) and a room near the suction grille (12). The indoor fan (21) is configured to blow air sucked from below through the bell mouth (24) in a circumferential direction of rotation of the indoor fan (21).

The indoor heat exchanger (22) is configured as a cross-fin type fin-and-tube heat exchanger. When viewed in plan, the indoor heat exchanger (22) is rectangular, and is arranged to surround the indoor fan (21). In the indoor heat exchanger (12), a refrigerant and room air (blown air) sent by the indoor fan (21) exchange heat.

The drain pan (23) is arranged below the indoor heat exchanger (22). The drain pan (23) receives drainage generated as a result of condensation of moisture in the air in the indoor heat exchanger (22). The drain pan (23) is provided with a drain pump (not shown) for discharging the drainage. The drain pan (23) is inclined so that the drainage is collected to part of the drain pan at which the drain pump is provided.

The lower casing (10b) is in the shape of a substantially rectangular parallelepiped box having an open bottom, and is attached to the lower portion of the upper casing (10a). An upper end surface of the lower casing (10b) constitutes a divider plate (25) described later. The lower casing (10b) contains, as shown in FIGS. 4 to 6, an air filter (30), a filter drive mechanism (40) as a filter drive section, a dust removing mechanism (50) as a dust removing section, a dust collecting case (60), a dust transfer mechanism (80) as a dust transfer section, and a dust container (90).

Figure 4:
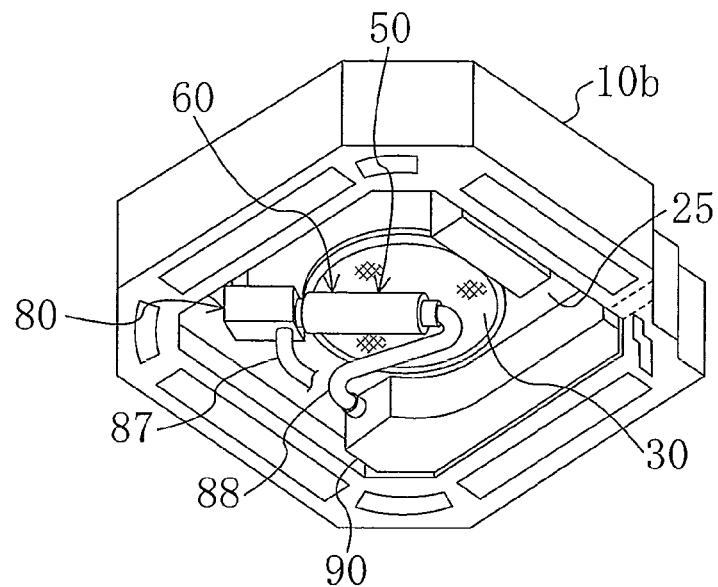
[FIG. 4]
Figure 5:
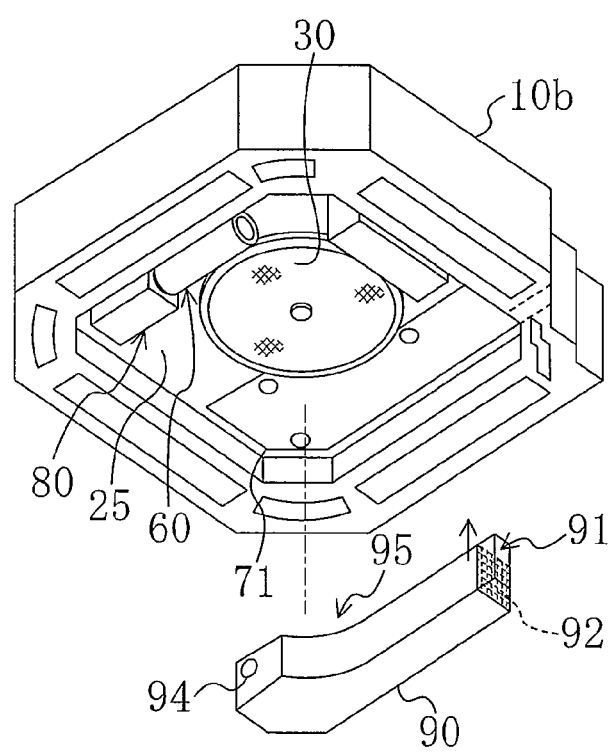
[FIG. 5]
Figure 6:
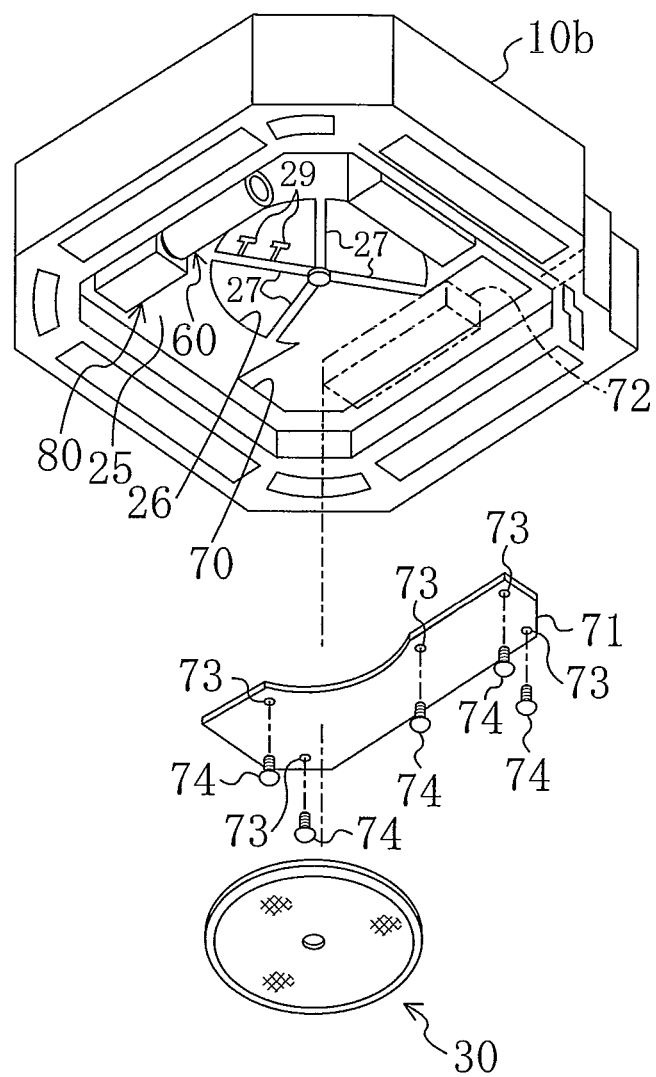
[FIG. 6]

As shown in FIGS. 4 to 6, the divider plate (25) is in the shape of a substantially rectangular plate when viewed in plan, and constitutes the upper surface of the lower casing (10b), and divides space between the bell mouth (24) and the suction grille (12) into an upper room and a lower room. Specifically, the divider plate (25) divides space upstream of the indoor heat exchanger (22) into a room near the indoor heat exchanger (22) containing the bell mouth (24), and a room near the suction grille (12). The divider plate (25) includes an air hole (26) for introducing outside air into the upper casing (10a), an access opening (70) which allows checking of an electrical component box (72) arranged in the upper casing (10a), and an access lid (71) for closing the access opening (70).

Figure 7:
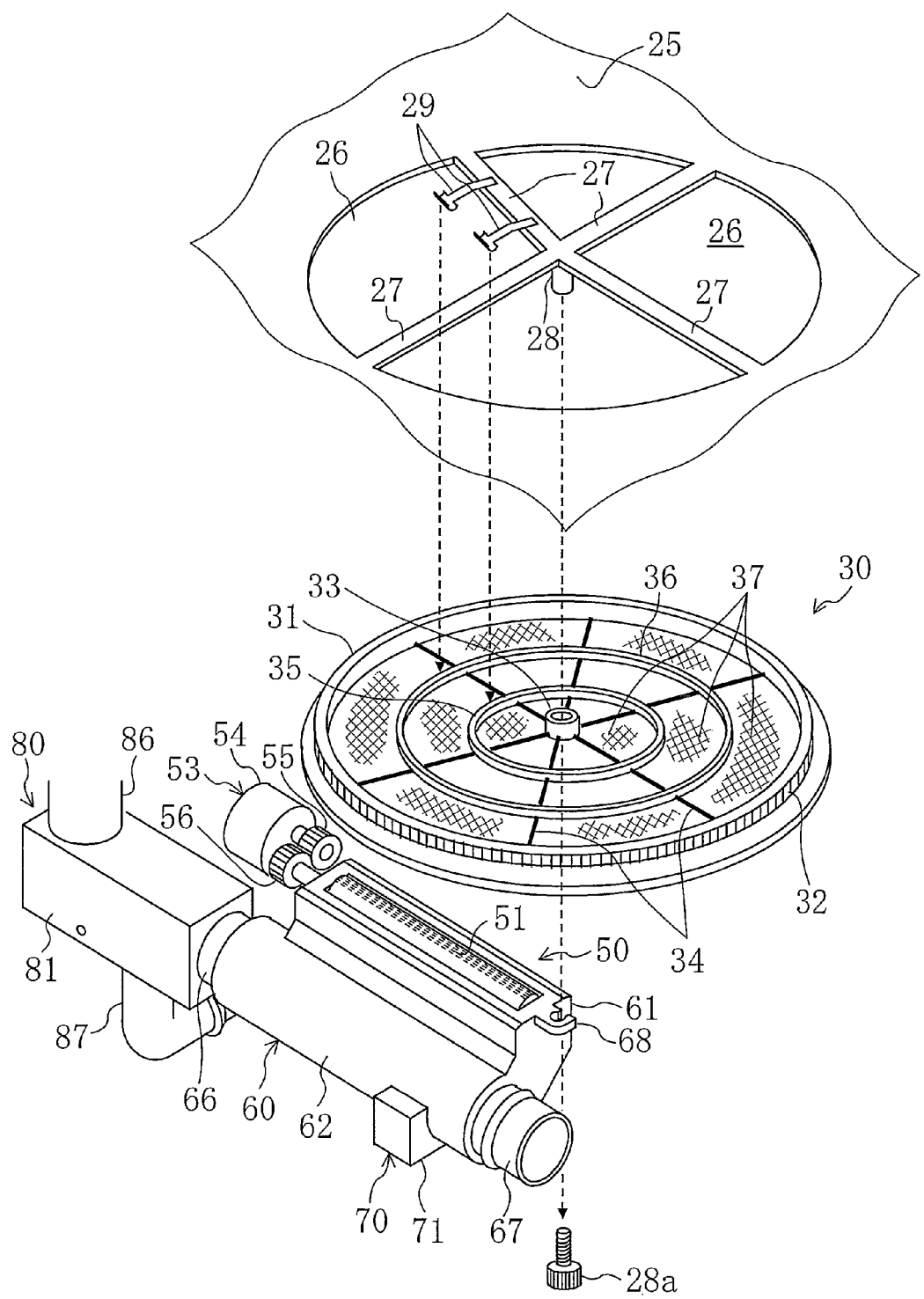
[FIG. 7]

As shown in FIG. 7, the air hole (26) is constituted of a round hole which is formed in the center of the divider plate (25). Four radial members (27) are provided to radially extend in the round hole, thereby dividing the round hole into fan-shaped openings.

As shown in FIGS. 5 and 6, the access opening (70) is substantially in the shape of a rectangle, which is substantially the same shape as the outer shape of an upper end surface of the dust container (90), and is formed in the divider plate (25) to correspond to the dust container (90). When viewed in plan, an inner side of the access opening (70) is arc-shaped along an edge of the air hole (26), and is connected to the air hole (26) divided into fan-shaped openings, thereby forming a single opening. As shown in FIGS. 3(A) and 3(B), the electrical component box (72) containing electrical components of the indoor unit (1), which would be checked, repaired, or replaced, is arranged in the upper casing (10a) above the access opening (70) (downstream in the air flow direction). The electrical component box (72) is in the shape of a rectangular parallelepiped box which is vertically oriented rectangular-shaped when viewed in plan, and is attached to a lower end surface of the upper casing (10a).

The access lid (71) is a flat member having the same shape as the access opening (70), and is slightly larger than the access opening (70), thereby covering the access opening (70) as shown in FIG. 5. The access lid (71) includes a plurality of bolt holes (73) formed in a peripheral portion thereof, and is fixed to the divider plate (25) by fastening bolts (74) in the bolt holes (73). When viewed in plan, an inner side of the access lid (71) is arc-shaped along the edge of the air hole (26), thereby constituting part of the edge of the air hole (26) together with the divider plate (25).

As shown in FIG. 7, the air filter (30) is arranged below the center of the divider plate (25), and is in the shape of a circle having a size enough to cover the air hole (26) formed in the divider plate (25). Specifically, the air filter (30) includes an annular filter body (31) and a mesh member (37). A gear (32) is formed on an outer circumferential surface of the filter body (31), and a cylindrical axis receiver (33) supported by six radial ribs (34) is formed in the center of the annular filter body (31). Specifically, each of the radial ribs (34) radially extends from the axis receiver (33).

An inner annular rib (35) and an outer annular rib (36) coaxial with the filter body (31) are formed radially inside the filter body (31). The outer annular rib (36) has a larger diameter than the inner annular rib (35). The mesh member (37) covers the whole part of the inside of the filter body (31). The air sucked through the inlet (13) passes through the mesh member (37), and flows into the bell mouth (124). The dust contained in the air is trapped on the mesh member (37).

The air filter (30) is biased downward when filter holders (29) abut the radial ribs (35, 36). Therefore, the air filter (30) is pressed onto a rotating brush (51) of a dust removing mechanism (50) described later. This increases the amount of dust removed by the dust removing mechanism (50).

Figure 8:
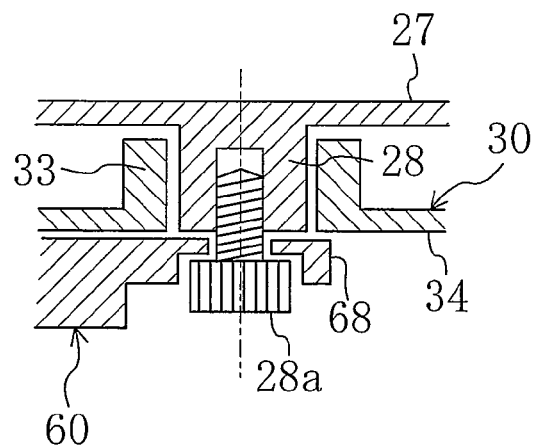
[FIG. 8]

As shown in FIG. 8, the air filter (30) is attached by fitting the axis receiver (33) on a filter rotation axis (28) of the divider plate (25). The air filter (30) is rotatable about the filter rotation axis (28). The dust collecting case (60) is arranged below the air filter (30). With the axis receiver (33) of the air filter (30) fitted on the filter rotation axis (28), a filter attachment (68) of the dust collecting case (60) is fixed to the filter rotation axis (28) of the divider plate (25) with a fixing screw (28a). Thus, the air filter (30) is held between the divider plate (25) and the dust collecting case (60).

Figure 9:
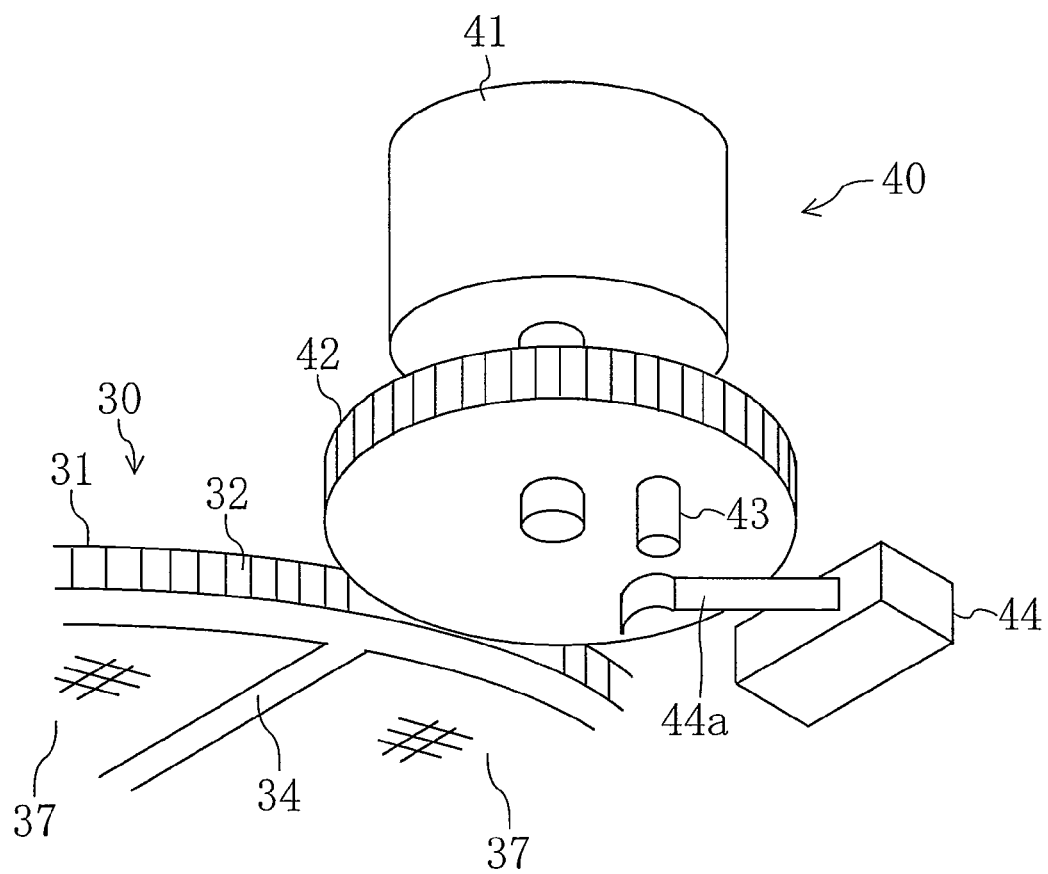
[FIG. 9]

A filter drive mechanism (40) for driving the air filter (30) to rotate is provided near the air filter (30) (see FIG. 2). The filter drive mechanism (40) includes a filter drive motor (41), and a limit switch (44) as shown in FIG. 9. A drive gear (42) is attached to a drive shaft of the filter drive motor (41), and the drive gear (42) engages with the gear (32) of the filter body (31). A switch actuator (43), which is a protrusion, is formed on one of the surfaces of the drive gear (42). The switch actuator (43) actuates a lever (44a) of the limit switch (44) in response to the rotation of the drive gear (42). The limit switch (44) detects the actuation of the lever (44a) by the switch actuator (43). That is, the switch actuator (43) and the limit switch (44) detect the rotational position of the drive gear (42).

The dust removing mechanism (50), the dust collecting case (60), and the dust transfer mechanism (80) will be described below with reference to FIGS. 7 to 10. The dust removing mechanism (50), the dust collecting case (60), and the dust transfer mechanism (80) are arranged below the divider plate (25) and the air filter (30) (see FIGS. 1 and 2).

The dust removing mechanism (50) is provided to remove the dust trapped on the air filter (30). The dust removing mechanism (50) includes a rotating brush (51) as a brush member, and a brush driving mechanism (53) as a brush driver. As shown in FIG. 7, the rotating brush (51) is arranged in a brush receiving opening of the dust collecting case (60) described later. The rotating brush (51) includes a narrow cylindrical shaft portion, and a bristle portion attached to an outer circumferential surface of the shaft portion. The bristle portion covers the circumference of the shaft portion, and extends in the longitudinal direction of the shaft portion.

A length of the rotating brush (51) is the same as or greater than the radius of the air filter (30). The rotating brush (51) is arranged to extend radially outward from the center of the air filter (30). The rotating brush (51) is configured in such a manner that the dust is removed from the mesh member (37) by the bristle portion coming into contact with the mesh member (37) of the rotating air filter (30). The rotating brush (51) is driven by the brush driving mechanism (53) to rotate in a reversible manner. The brush driving mechanism (53) includes a brush drive motor (54), and a drive gear (55) and a driven gear (56) engaging with each other. The drive gear (55) is attached to a drive shaft of the brush drive motor (54), and the driven gear (56) is attached to an end of the shaft portion of the rotating brush (51). The gears engage with each other to rotate, thereby driving the rotating brush (51) to rotate. The bristle portion of the rotating brush (51) is made of so-called pile fabric. The pile fabric is hairy fabric obtained by weaving an extra fiber (pile yarn) into base fabric, and has relatively short bristles projecting from the base fabric. The pile fabric is inclined pile fabric in which the bristles are inclined in a certain direction.

The dust collecting case (60) temporarily contains the dust removed from the rotating brush (51) by a cleaning brush (not shown). The dust collecting case (60) is a columnar container.

An upper portion of the dust collecting case (60) is a remover portion (61) which removes the dust on the air filter (30), and a lower portion is a collector portion (62) which collects the dust removed from the air filter (30).

A brush receiving opening is formed in a top plate of the removal portion (61) to extend in the longitudinal direction of the dust collecting case (60), and the rotating brush (51) is arranged in the brush receiving opening as described above. The above-described filter attachment (68) is formed at a side surface of the removal portion (61). A lower portion (a bottom) of the collector portion (62) is convex curved. The dust removed from the rotating brush (51) by the cleaning brush falls in, and is collected in the convex curved portion of the collector portion (62). Longitudinal ends (66, 67) of the collector portion (62) are opened. A first end (66) of the collector portion (62) is connected to a damper box (81) of a dust transfer mechanism (80) described later, and a second end (67) is connected to a transfer duct (88) of a dust transfer mechanism (80) described later. Although not shown, the dust collecting case (60) includes a dust amount detector for detecting the amount of dust contained in the collector portion (62).

Figure 10:
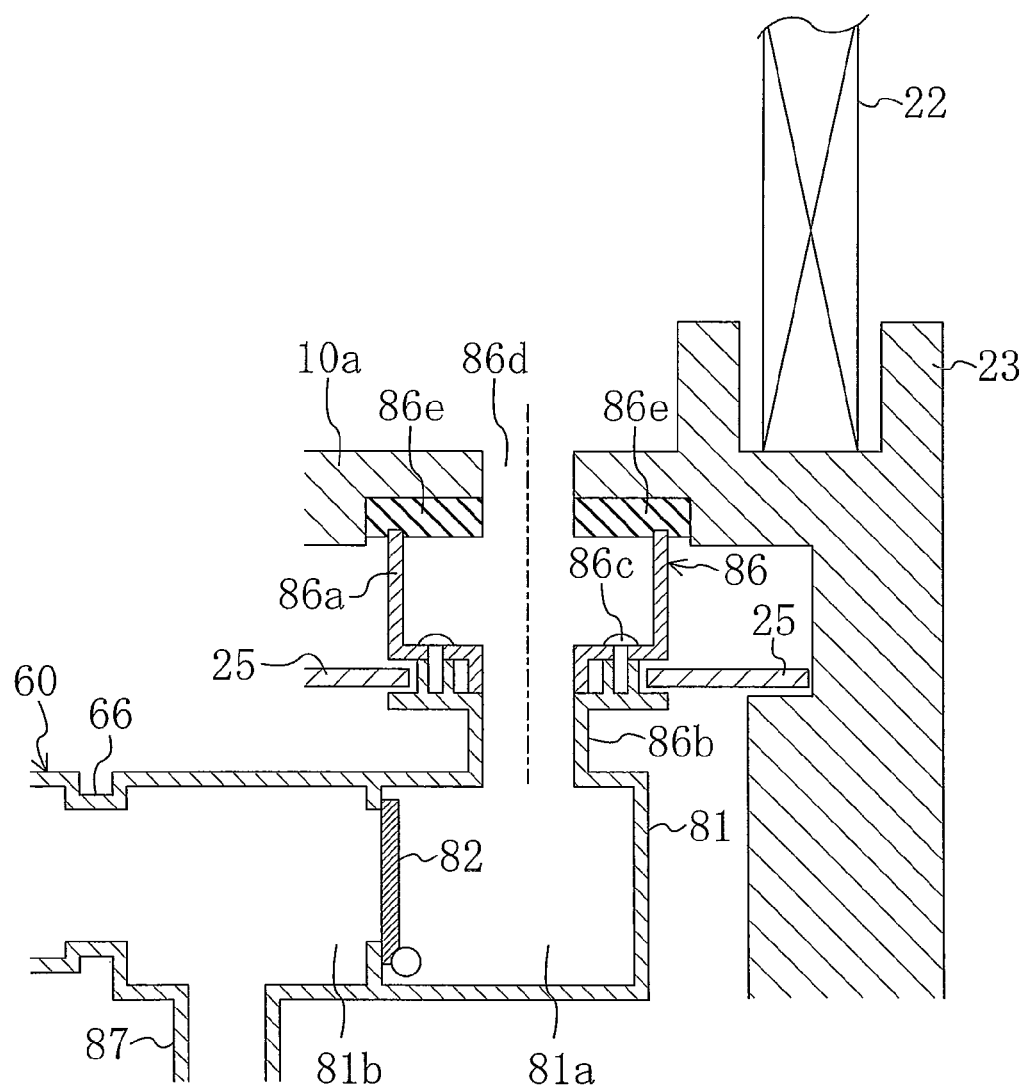
[FIG. 10]

The dust transfer mechanism (80) includes the damper box (81) and the transfer duct (88) described above, an entrance duct (86), and a suction duct (87) as shown in FIGS. 2, 7, and 10.

The damper box (81) is in the shape of a rectangular parallelepiped extending in the longitudinal direction of the collector portion (62) of the dust container (60) as shown in FIG. 10. The first end (66) of the collector portion (62) is connected to a longitudinal end of the damper box (81). The damper box (81) contains a damper (82) as an opening/closing member. Closing the damper (82) divides space inside the damper box (81) into rooms aligned in the longitudinal direction. Specifically, the space inside the damper box (81) is divided into a first room (81a) and a second room (81b). As described above, the first end (66) of the collector portion (62) is connected to the second room (81b).

The entrance duct (86) is connected to an upper surface of the damper box (81), and communicates with the first room (81a). As shown in FIG. 10, the entrance duct (86) extends vertically upward from the damper box (81), and penetrates the divider plate (25). The entrance duct (86) includes an upstream duct (86a) and a downstream duct (86b), both of which are circular when viewed in a lateral cross-sectional view. The two ducts (86a, 86b) are attached to the divider plate (25) with fixing screws (86c). A lateral cross-sectional area (a flow path area) of the upstream duct (86a) is larger than a lateral cross-sectional area (a flow path area) of the downstream duct (86b). A lower end portion of the downstream duct (86b) (a lower end portion in FIG. 10) is connected to the damper box (81), and communicates with the inside of the damper box. An upper end portion of the upstream duct (86a) (an upper end portion in FIG. 10) is in contact with a lower surface of the bell mouth (24) with a sealing member (86e) interposed therebetween.

An inlet (86d) as a through hole is formed in the lower surface of the upper casing (10a). The upstream duct (86a) communicates with the room including the indoor fan (21) through the inlet (86d). Specifically, the entrance duct (86) brings the air blown from the indoor fan (21) into the damper box (81). A junction between the upstream duct (86a) and the downstream duct (86b) of the entrance duct (86) is located in a through hole formed in the divider plate (25). Specifically, the ducts (86a, 86b) are connected in such a manner that a bottom plate of the upstream duct (86a) and an upper flange of the downstream duct (86b) sandwich the edge of the through hole in the divider plate (25). As shown in FIG. 5, the junction and the sealing member (86e) are configured in such a manner that the entrance duct (86), the damper box (81), and the dust collecting case (60) rotate together about the axial center of the entrance duct (86).

An inlet end of the suction duct (87) is connected to the lower surface of the damper box (81), and communicates with the second room (81b). The other outlet end of the suction duct (87) is connected to the cleaner insertion hole (18) formed in the decorative panel (11). The cleaner insertion hole (18) is provided to receive a hose of a cleaner etc., inserted therein, thereby sucking the dust collected in the collector portion (62) of the dust collecting case (60). The suction duct (87) is made of a flexible tube.

As shown in FIGS. 1 and 2, one end of the transfer duct (88) is connected to the second end (67) of the collector portion (62) of the dust collecting case (60), and the other end is connected to a dust container (90) described later. The transfer duct (88) is made of a flexible tube.

In the dust transfer mechanism (80), the damper (82) in the damper box (81) is closed in normal operation of performing cooling and heating. Therefore, the air blown from the indoor fan (21) is not introduced to the damper box (81). In the dust transfer mechanism (80), the damper (82) in the damper box (81) is opened when the dust in the dust collecting case (60) is transferred to the dust container (90). This allows the air blown from the indoor fan (21) to enter the dust collecting case (60) through the entrance duct (86) and the damper box (81). As a result, the dust in the dust collecting case (60) is transferred to the dust container (90) together with the air through the transfer duct (88). Specifically, the dust transfer mechanism (80) is configured to transfer the dust in the dust collecting case (60) to a predetermined location using the air blown from the indoor fan (21). Further, in the dust transfer mechanism (80), the damper (82) in the damper box (81) is closed when the dust in the dust container (90) is discharged outside the casing (10). In this case, the dust in the dust container (90) is sucked by a cleaner inserted in the cleaner insertion hole (18) through the transfer duct (88), the damper box (81), and the suction duct (87).

The structure of the dust container (90), which is a feature of the invention, will be described with reference to the drawings.

As shown in FIGS. 1, 2, and 5, the dust container (90) contains the dust transferred from the dust collecting case (60). The dust container (90) is in the shape of a rather narrow, rectangular parallelepiped box.

The dust container (90) is arranged on a lower surface of the divider plate (25) to be located below the indoor heat exchanger (22), and below the access lid (71). Specifically, the dust container (90) is located outside the air flow running from the inlet (13) to the indoor heat exchanger (22). Specifically, the dust container (90) is arranged outside the air hole (26) to be located around the air hole (26).

One of longitudinal end surfaces of the dust container (90) in which a dust flow port (94) described later is formed has a larger area than the other longitudinal end surface of the dust container (90) in which a discharge portion (91) is formed. An inner side surface of the dust container (90) includes an arc-shaped concave portion (95) curved along the air hole (26) so as not to overlap with the air filter (30) when viewed in plan. A corner on the one of the longitudinal side surfaces of the dust container (90) forms a curved guide plane (96) inside the dust container (90). The guide plane (96) sends the air and the dust introduced into the dust container (90) to every part of the dust container (90). The dust container (90) is arranged below the divider plate (25) along one of the sides of the divider plate.

Specifically, the dust container (90) is arranged outside the flow of air which is sucked by the indoor fan (21) through the inlet (13), and is blown to the indoor heat exchanger (22) in the lower casing (10b). The dust container (90) includes a dust flow port (94) formed in one of the longitudinal end surfaces thereof to which the transfer duct (88) is connected, and a discharge portion (91) formed in the other longitudinal end surface for discharging the air in the dust container (90) outside.

The dust flow port (94) has a substantially round opening, and is arranged in a lower portion of the one end surface of the dust container (90). One end of the transfer duct (88) is connected to the dust flow port (94).

The discharge portion (91) has a substantially rectangular opening, and is formed in the other end surface opposite the one longitudinal end surface to which the transfer duct (88) is connected. The discharge portion (91) is connected to a discharge passage (19) formed in the lower casing (10b), and communicates with the outside of the casing (10). A filter (92) is attached to the discharge portion (91). The filter (92) allows discharge of only the air in the dust container (90) outside. The filter (92) is detachably attached to the dust container (90) as shown in FIG. 5. A sealing member (93) is provided at a junction between the dust container (90) and the discharge passage (19).

When the dust is transferred by the air from the dust collecting case (60) to the dust container (90), the air inside the dust container (90) is discharged from the discharge passage (19) through the discharge portion (91). In this case, the filter (92) does not allow the transferred dust to flow outside the casing (10) through the discharge portion (91). When the dust is sucked out of the dust container (90) by the cleaner, air pressure in the dust container (90) decreases. Then, the outside air enters the dust container (90) through the discharge passage (19). In this way, the air pressure in the dust container (90) is kept in good balance by supplying and discharging the air through the discharge portion (91), and therefore, the dust transfer operation to the dust container (90), and the dust discharge operation from the dust container (90) can suitably be performed.

-Working Mechanism-

Normal operation of cooling and heating the room, and filter cleaning operation of cleaning the air filter (30) performed by the indoor unit (1) will be described below. The indoor unit (1) is capable of switchably performing the normal operation and the filter cleaning operation.

In the normal operation, the indoor fan (21) is driven. In the indoor unit (1), room air admitted through the inlet (13) passes through the air filter (30) to enter the bell mouth (24). When the room air passes through the air filter (30), dust in the room air is trapped on the mesh member (37) of the air filter (30). The room air that entered the bell mouth (24) is blown from the indoor fan (21). The blown air is cooled or heated as it exchanges heat with the refrigerant in the indoor heat exchanger (22), and is supplied to the inside of the room through the outlets (14). In this way, the room is cooled or heated. In this operation, the damper (82) of the damper box (81) is closed. Therefore, the air blown from the indoor fan (21) does not enter the dust collecting case (60) through the damper box (81).

The filter cleaning operation will be described below. In the filter cleaning operation, the compressor in the refrigerant circuit is suspended not to circulate the refrigerant. Further, dust removal operation, dust transfer operation, and dust discharge operation is performed in a switchable manner.

The dust removal operation is operation to remove the dust trapped on the air filter (30). In the dust removal operation, the indoor fan (21) is rotated, and the rotating brush (51) is rotated to bring the bristle portion into contact with the air filter (30). When the air filter (30) is rotated in this state, the dust on the air filter (30) is captured by the bristle portion of the rotating brush (51).

The dust removal operation is preferably performed while rotating the indoor fan (21). Specifically, the air sucked into the indoor fan (21) can make the dust adhered to the air filter (30), thereby allowing efficient removal of the dust on the air filter (30) by the rotating brush (51). When the lever (44a) of the limit switch (44) of the filter drive mechanism (40) is actuated, the filter drive motor (41) stops, and then the air filter (30) stops. That is, the air filter (30) rotates by a predetermined angle, and then stops. In this way, the dust on a portion of the air filter (30) that passed through the bristle portion of the rotating brush (51) is removed. The dust removal operation may be performed with the indoor fan (21) stopped.

The dust transfer operation is operation to transfer the dust from the dust collecting case (60) to the dust container (90). In the dust transfer operation, the rotating brush (51) is suspended, and the air filter (30) is suspended. The damper (82) of the damper box (81) is opened. In this state, the indoor fan (21) is driven, and the air blown from the indoor fan (21) sequentially passes through the entrance duct (86) and the damper box (81), and is introduced to the dust collecting case (60). Thus, the dust in the dust collecting case (60) is transferred to the dust container (90) through the transfer duct (88) together with the air. The dust is then blown into the dust container (90) together with the air. The air and the dust are guided by the guide plane (96), and are sent to every part of the dust container (90).

The dust discharge operation is operation to discharge the dust in the dust container (90) outside the casing (10). For example, in the dust discharge operation, the dust transfer operation is performed several times (for a predetermined period) to perform the dust discharge operation. Alternatively, the dust discharge operation may be performed using a remote controller handled by a user. In the dust discharge operation, as shown in FIG. 3(C), the user attaches the cleaner to the cleaner insertion hole (18) of the decorative panel (11).

The cleaner insertion hole (18) communicates with the suction duct (87) of the damper box (81). Therefore, when the user actuates the cleaner attached to the cleaner insertion hole (18), the dust in the dust container (90) is sucked into the cleaner together with the air. In this case, the air entered through the discharge portion (91) is guided by the guide plane (96) to flow through the dust container (90), and is discharged outside the dust container (90) together with the dust. Then, the air passes through the transfer duct (88) and the dust collecting case (60) to enter the damper box (81), and is sucked into the cleaner.

-Advantages of Embodiment-

According to the present embodiment, the dust container (90) is arranged outside the flow of air sucked into the casing (10) by the indoor fan (21). Thus, the air passing through the casing (10) is reliably prevented from striking the dust container (90). This allows introduction of the room air sucked into the casing (10) into the heat exchanger (22) without leakage. This can improve the air conditioning capability.

In particular, with the dust container (90) arranged outside the air hole (26), the air passing inside the casing (10) can reliably be prevented from striking the dust container (90).

The dust container (90) is arranged around the air hole (26) formed in the divider plate (25). Therefore, the room air passing through the air hole (26) can reliably be prevented from striking the dust container (90). This can increase the amount of air supplied to the heat exchanger (22), thereby improving the air conditioning capability.

Further, with the provision of the dust container (90) below the divider plate (25), inspection, repair, replacement, etc. of the dust container (90) can be done without detaching the divider plate (25).

With the provision of the dust container (90) below the heat exchanger (22), the air blown from the indoor fan (21) can reliably be prevented from striking the dust container (90). This can increase the amount of air supplied to the heat exchanger (22), thereby improving the air conditioning capability.

The dust container (90) includes the concave portion (95) extending along the edge of the air hole (26). This can reliably prevent the air passing through the air hole (26) from striking the dust container (90). This can increase the amount of air supplied to the heat exchanger (22), thereby improving the air conditioning capability.

The dust container (90) is arranged upstream of the air passing through the air filter (30) of the divider plate (25). Therefore, the dust container (90) can be checked without detaching the divider plate (25). This allows easy maintenance of the indoor unit (1).

The corners inside the dust container (90) form the guide plane (96) for guiding the air. Therefore, the air and the dust introduced to the dust container (90) can be sent to every part of the dust container (90). This makes it possible to contain the dust in the dust container (90) without accumulating the dust in an uneven manner.

The dust container (90) is arranged outside the range of rotation of the dust removing mechanism (50). Therefore, the dust removing mechanism (50) can rotate without detaching the dust container (90). This allows detachment of the air filter (30) with the dust container (90) attached, thereby allowing easy maintenance of the indoor unit (1).

The discharge portion (91) formed in the dust container (90) and the discharge passage (19) formed in the lower casing (10b) are connected. Therefore, the air that entered the dust container (90) through the dust flow port (94) can be discharged outside the casing (10) from the discharge passage (19) through the discharge portion (91). When the air in the dust container (90) is discharged outside from the dust flow port (94), the air outside the casing (10) can be admitted into the dust container (90) from the discharge passage (19) through the discharge portion (91). This allows keeping of the air pressure in the dust container (90) in good balance.

<Second Embodiment>

Figure 11:
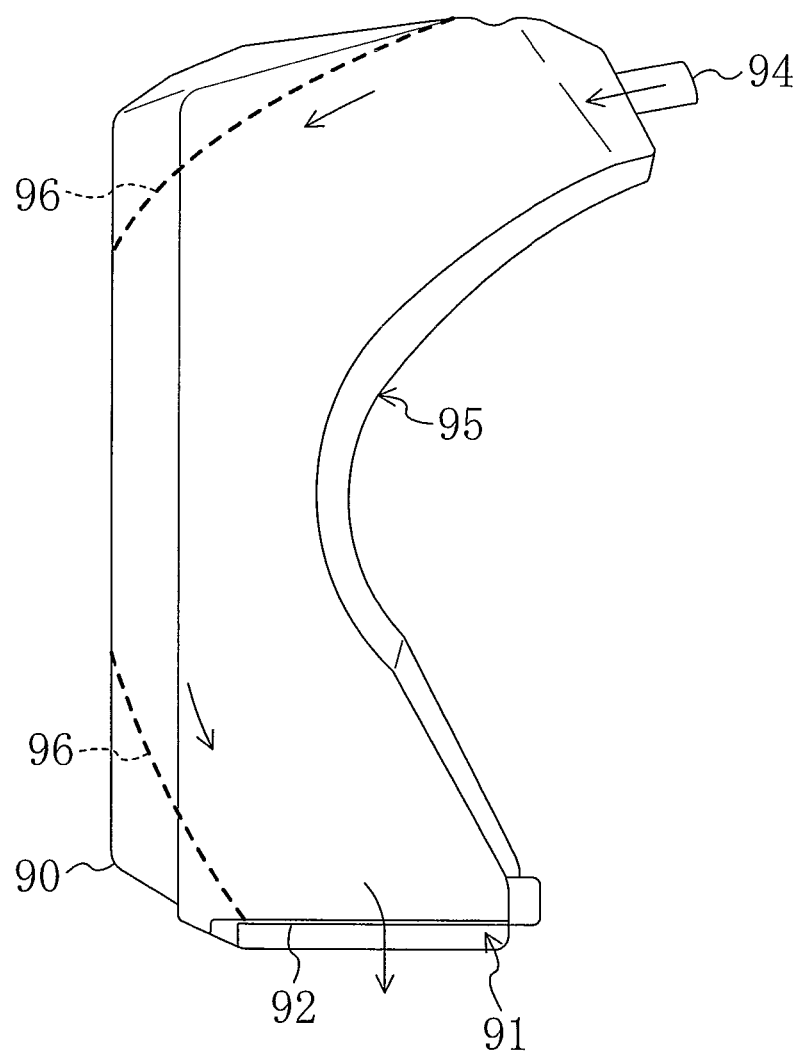
[FIG. 11]

The present embodiment is directed to an alternative example of the dust container (90). As shown in FIG. 11, in the dust container (90), a corner on one longitudinal end surface of the dust container (90), and a corner on the other longitudinal end surface of the dust container (90) inside the dust container (90) form curved guide planes (96), respectively. The other features and advantages of the second embodiment are the same as those of the first embodiment.

<Third Embodiment>

Figure 12:
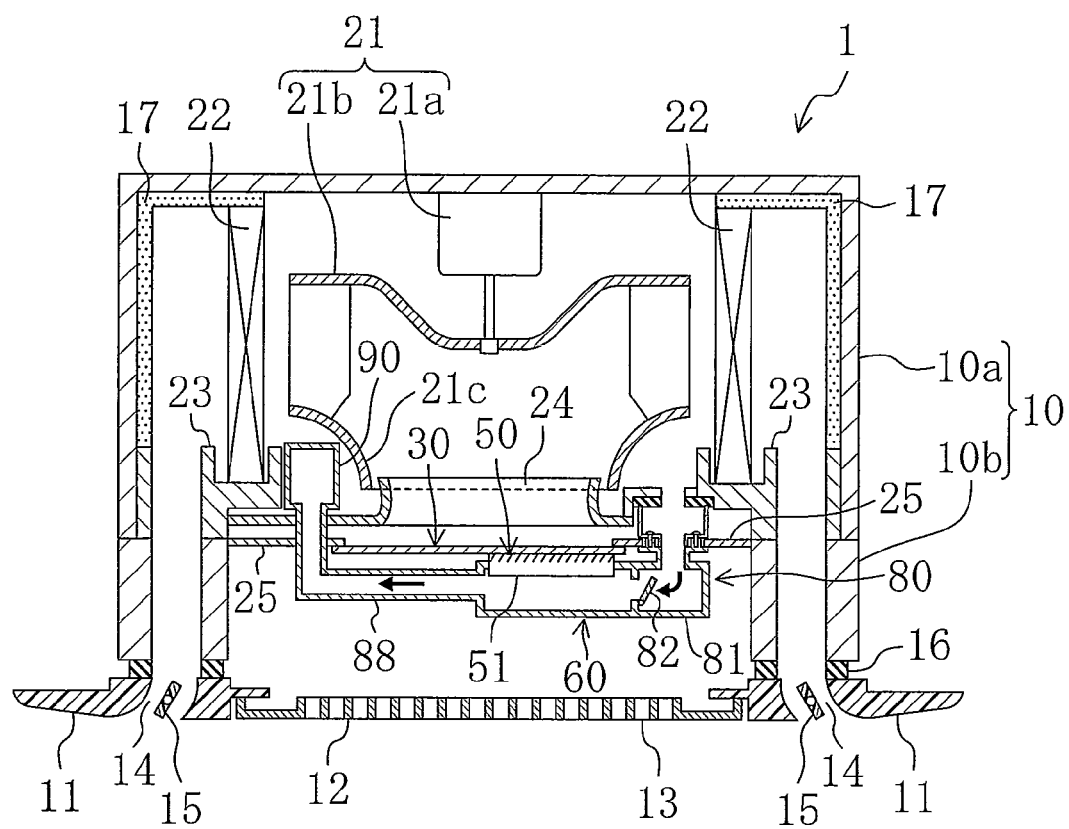
[FIG. 12]

In the first embodiment, the dust container (90) is arranged below the divider plate (25) to be located around the air hole (26). However, in the present embodiment, the dust container (90) is located around the shroud (21c) of the indoor fan (21) as shown in FIG. 12.

Specifically, the dust container (90) is arranged on an upper surface of a flat portion of the bell mouth (24). The transfer duct (88) of the dust transfer mechanism (80) penetrates the divider plate (25) and the bell mouth (24) from a lower side of the divider plate (25) to extend to an upper side of the bell mouth (24), and is connected to the dust container (90).

Thus, according to the present embodiment, the dust container (90) is located around the shroud (21c) of the indoor fan (21), thereby reliably preventing the room air from striking the dust container (90). This increases the amount of air supplied to the heat exchanger (22), thereby improving the air conditioning capability. The other features and advantages are the same as those of the first and second embodiments.

<Other Embodiments>

The above-described embodiments of the present invention may be modified in the following manner In the embodiments described above, the invention is applied to the filter cleaning of cleaning the filter by abutting the rotating brush (51) to the rotating air filter (30). However, the invention may also be applied to the filter cleaning performed in other way.

In the third embodiment, the dust container (90) is located around the shroud (21c) of the indoor fan (21). However, as an alternative example of the invention, the dust container (90) can be located around the bell mouth (24) of the indoor fan (21). Specifically, the dust container (90) may be arranged above the flat portion of the bell mouth (24), and near the cylindrical portion of the bell mouth (24). This configuration can also prevent the room air from striking the dust container (90) with reliability. Further, this can increase the amount of air supplied to the heat exchanger (22), thereby improving the air conditioning capability.

The above-described embodiments have been set forth merely for the purposes of preferred examples in nature, and are not intended to limit the scope, applications, and use of the invention.

INDUSTRIAL APPLICABILITY

As described above, the invention is useful for improving the air conditioning capability of the indoor unit of the air conditioner.

DESCRIPTION OF REFERENCE CHARACTERS

10 Casing
13 Inlet
19 Discharge passage
21 Indoor fan
22 Indoor heat exchanger
25 Divider plate
26 Air hole
30 Air filter
50 Dust removing mechanism (dust removing section)
88 Transfer duct
90 Dust container
91 Discharge port
95 Concave portion
96 Guide plane

The invention claimed is:

1. An indoor unit of an air conditioner comprising:
   a casing having an inlet;
   an air filter having a filter body and a mesh member, the air filter contained in the casing and located downstream of the inlet in the air flow direction;
   an indoor fan and a heat exchanger contained in the casing and located downstream of the air filter in the air flow direction;

a divider plate which includes an air hole for attaching the air filter therein, and is provided in the casing to divide space inside the casing into a room upstream of air passing through the air filter and a room downstream of the air passing through the air filter;

a dust removing section provided upstream of the air filter in the air flow direction and including a rotating brush that removes dust trapped on the air filter; and a dust container connected to the dust removing section via a transfer duct for containing the dust which is removed by the dust removing section, and is transferred through the transfer duct, wherein the dust container is located in the casing between the divider plate and an end of the casing in which the inlet is formed, such that the dust container covers a portion of the divider plate outside the circumference of the air hole formed in the divider plate, and the rotating brush extends from an edge of the air filter to the center of the air filter to be in contact with a side of the air filter upstream of the air flow passing through the air filter, and to rotate about one end of the dust removing section.

2. The indoor unit of the air conditioner of claim 1, wherein the dust container is arranged on the divider plate to be located around the air hole.

3. The indoor unit of the air conditioner of claim 1, wherein the dust container includes a concave portion extending along an edge of the air hole when viewed in plan.

4. The indoor unit of the air conditioner of claim 1, wherein the dust container is in the shape of a rectangular box, and a corner inside the dust container forms a guide plane for guiding air introduced into the dust container.

5. The indoor unit of the air conditioner of claim 1, wherein the dust container includes a discharge port which allows the inside and the outside of the dust container to communicate with each other, and the casing includes a discharge passage which communicates with the outside of the casing and is connected to the discharge port.

6. An indoor unit of an air conditioner comprising:

a casing having an inlet;

an air filter having a filter body and a mesh member, the air filter contained in the casing and located downstream of the inlet in the air flow direction;

an indoor fan and a heat exchanger contained in the casing and located downstream of the air filter in the air flow direction;

a divider member which includes an air hole for attaching the air filter therein, and is provided in the casing to divide space inside the casing into a room upstream of air passing through the air filter and a room downstream of the air passing through the air filter;

a dust removing section provided upstream of the air filter in the air flow direction and including a rotating brush that removes dust trapped on the air filter; and a dust container connected to the dust removing section via a transfer duct for containing the dust which is removed by the dust removing section, and is transferred through the transfer duct, wherein the dust container is located in the casing between the divider member and an end of the casing in which the inlet is formed, such that the dust container covers a portion of the divider member outside the circumference of the air hole formed in the divider member, the rotating brush extends from an edge of the air filter to the center of the air filter to be in contact with a side of the air filter upstream of the air flow passing through the air filter, and to rotate about one end of the dust removing section, and the dust container is located outside the edge of the air filter.

* * * * *